United States Patent [19]

Levin et al.

[11] Patent Number: 4,654,391
[45] Date of Patent: Mar. 31, 1987

[54] GRAFTING OF EPOXY RESIN ON AMIDE

[75] Inventors: Gideon Levin, Rehovot; Hemi N. Nae, Givat Shmuel, both of Israel

[73] Assignee: Yeda Research and Development Co., Ltd., Rehovot, Italy

[21] Appl. No.: 801,815

[22] Filed: Nov. 26, 1985

[30] Foreign Application Priority Data

Nov. 26, 1984 [IL] Israel .......................................... 73637

[51] Int. Cl.[4] .......................... C08F 259/04; C08F 259; C08F 06
[52] U.S. Cl. ..................................... 525/113; 525/116; 525/121
[58] Field of Search ................. 525/113, 120, 121, 116

[56] References Cited

FOREIGN PATENT DOCUMENTS 0738495  7/1966  Canada .................................. 525/113
42-22293 11/1967  Japan .................................... 525/113
58-138744 8/1983  Japan .................................... 525/113

Primary Examiner—John C. Bleutge
Assistant Examiner—Robert E. L. Sellers, II
Attorney, Agent, or Firm—Browdy and Neimark

[57] ABSTRACT

There are provided polymers containing chlorine wherein part of the chlorine atoms are substituted by thio-amide groups and where a further part of the chlorine atoms are substituted by epoxy moieties. Starting materials of choice are chlorinated polyalkylenes, polyvinyl chloride and polyvinylidene chloride. The polymers are produced by first producing a chlorine containing polymer wherein part of the chlorine is substituted by thio-amide groups, and further reacting such product with an epoxy resin so as to introduce epoxy groups.

12 Claims, 1 Drawing Figure

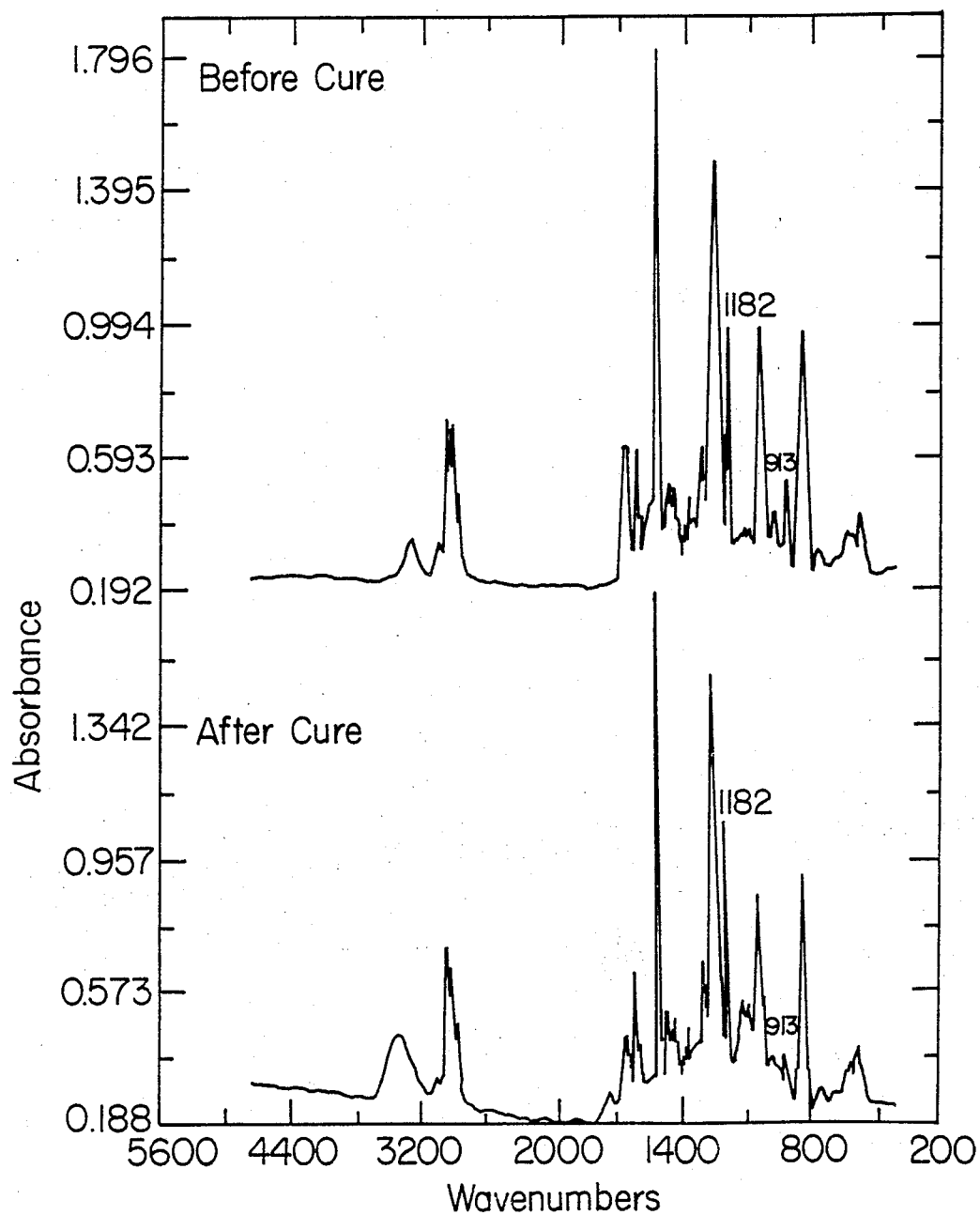

GRAFTING OF EPOXY RESIN ON AMIDE

FIELD OF THE INVENTION

It is an object of the present invention to provide novel polymeric composition of matter. More specifically, the invention relates to polymeric materials composed of chlorine containing polymers partially substituted by thio amide group as component (A) and epoxy moieties as component (B). The reaction of components (A) and (B) provide a family of novel polymers containing chlorine, sulfur and nitrogen.

BACKGROUND OF THE INVENTION

Chemically modified polyvinyl chloride compositions are numerous and well-known. The usual approach to the modification of this type of polymer is by means of grafting onto the macromolecule of various other reactive monomers, telomers or other entities, by chemical, photochemical or radiation induced reactions. Processes of this kind are well documented. Thus, A. Chapiro, in his book "Radiation Chemistry of Polymeric Systems", V., 15, 1962, extensively quotes many cases of radiation grafting of various monomers to P.V.C. More recently, Kennedy has developed a general method for the chemical grafting of certain monomers to P.V.C., using an alkyl-aluminum catalyst (Cationic Graft Copolymerization, Ed. J. P. Kennedy, Interscience, 1977). No commercial application has, to our knowledge, resulted from these and similar approaches for several reasons. Radiation-grafting requires expensive and cumbersome equipment, as well as elaborate safety precautions. The catalytic methods of Kennedy involve the use of expensive and dangerous-to-handle metallo-organic compounds. In addition, to effect a grafting reaction on P.V.C. in accordance with the various methods described in the literature, the P.V.C. has to be dissolved in an organic anhydrous solvent, such as cyclohexanone, or tetrahydrofuran, forming very viscous solutions even at quite low concentrations, which are extremely difficult to handle in a chemical reaction. This is the main reason why previous attempts to modify P.V.C. by grafting reactions remain to date a laboratory exercise only.

The interest in graft-modified P.V.C. is very considerable. This is spurred by the various well known shortcomings of neat polyvinyl chloride, especially when intended for certain particular uses. Thus, P.V.C. is largely used in a highly plasticized form, for the production of films, tubings, coatings, etc. The common plasticizers used, such as the various phthalate esters, and particularly di-2-ethylhexyl phthalate, lack in "permanence" and tend to exude in time from the polymer compositions, leaving a brittle and friable object. The extraction of plasticizer—which does not form a chemical bond with the macromolecule—is particularly accelerated by contact with various solvents that leach it out from the polymer matrix. Such plasticized compositions are, therefore, restricted to use in solvent-less environments.

As a result of the possible exudation of the phthalate plasticizers these compositions have lately become a subject for review, since they have been shown to induce tumors in the liver of mice (C. E. News p. 5, May 5, 1980).

Another well-known drawback of commercial P.V.C. compositions is their hydrophobic nature. This results in the accumulation of static electricity, and the easy deposition of dust, which in certain applications (music records, greenhouse coverings, textile fibers) is very deleterious.

A recent U.S. Pat. No. 4,298,714 by Levin and Vofsi relating to the modification of P.V.C. by thio-etheric group (i.e. $-S-(CH_2-CH_2-O)_n-R$), reveals the possibility of grafting on P.V.C. the above groups and thus creating a composition of material which behaves like internally plasticized P.V.C.

SUMMARY OF THE INVENTION

Using epoxy resin as a stabilizer for P.V.C. has the disadvantage that the stabilizer will migrate out with time from the polymer matrix. However, attaching the epoxy resin by chemical bond to the P.V.C. will eliminate the migration problem, will create a polymer characterized by the durability of the epoxy resin and the flame retardent property of the P.V.C. backbone. Also, the epoxy resin, while bonded to the backbone of the amide modified P.V.C., will form an internally plasticized polymer with the ability to create a network by changing the composition of the materials involved and changing the curing temperature.

BRIEF DESCRIPTION OF THE DRAWING

FIG. 1 shows a comparison of FTIR analysis before and after aging.

According to the invention there is provided a new composition of matter which is an amide modified P.V.C. (component A), which is reacted with an epoxy resin (component B) either by heating the two components together or by using a catalyst. Specifically, the process of this invention allows the grafting onto the amide modified P.V.C. or other amide modified polymers containing chlorine, the general class of compounds having the formula:

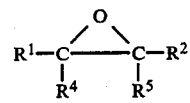

resulting in a family of novel modified P.V.C. or other polymers containing chlorine.

The reaction between the modified P.V.C. and the oxirane ring compounds is represented by the following scheme:

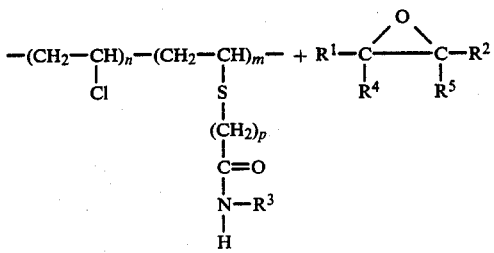

-continued

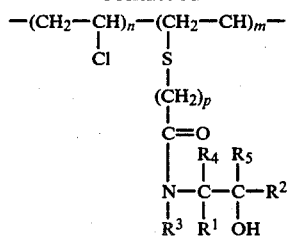

where 'n' and 'm' may be an integer from 1 to 100. $R^3$ may be hydrogen, an alkyl group, benzoyl or polyamide. $R^5$, $R^4$, $R^2$ and $R^1$ can be hydrogen, alkyl group or a residue of an epoxy resin.

While the above scheme represents the process in accordance with the invention, the preferred reaction is the one wherein $R^1$ stands for

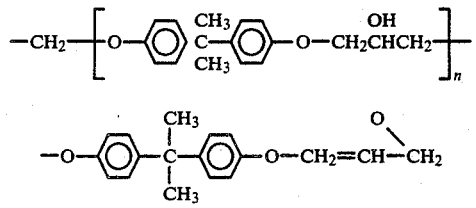

and $R^2$ stand for hydrogen, thus, component A and component B may be mixed while each one of them is dissolved in a common solvent such as chloroform, tetrahydrofurane, cyclohexanone, etc.

Formation of epoxy grafted on P.V.C. via amide pending groups may form a complete spectrum of materials starting from a flexible polymer through a highly crosslinked material with resistance to chemicals and solvents.

Among suitable epoxy resins are diglycidyl ether of bisphenol A, such as EPON 828, triglycidyl ether of tris hydroxy phenyl methane and tetraglycidyl of diamino diphenyl methane such as MY-720.

EXAMPLES

General Procedure (I) Reaction on PVC Suspension

A measured amount of suspension or emulsion of polyvinylchloride (Frutarom, Electrochemical Co., Haifa, Israel) in water was continuously stirred and heated on an oil bath. Solvent such as DMF, THF, cyclohexanone or methylethylketone is added to the slurry. While mixing, the sodium or calcium salt of N-butyl-3-mercaptopropionamide was added. At the same time, a small amount of tricaprylyl methyl ammonium chloride (phase transfer catalyst) was added to the reaction mixture. The reaction mixture was kept at 60° C. and from time to time samples were withdrawn from the reaction mixture. The suspension is separated and the polymer is washed several times with distilled water, methanol and ether. The polymer obtained after washing is dissolved in tetrahydrofuran or chloroform and reprecipitated in methanol. The polymer obtained in this way was analyzed for sulfur, nitrogen and chlorine; also NMR and IR of the grafted polymer was taken.

The results are summarized in Table 1.

TABLE 1

The reaction between the sulfur [S] and chlorine [Cl] content on the grafted PVC and the time of reaction*.

| Time (min) | [Cl] % | [S] % | Extent of reaction |
|---|---|---|---|
| 30 | 50.25 | 1.57 | 0.0917 |
| 45 | 49.90 | 2.06 | 0.1203 |
| 75 | 47.30 | 2.45 | 0.1432 |
| 120 | 44.75 | 3.28 | 0.1922 |
| 175 | 42.65 | 4.00 | 0.2337 |
| 240 | 39.20 | 4.67 | 0.2729 |
| 300 | 36.95 | 5.75 | 0.3360 |
| 1295 | 23.75 | 9.15 | 0.5347 |

*The reaction mixture included 80 ml epivyl 43 (~40% solid content), 36.8 gr of
HS—CH$_2$—CH$_2$—C(=O)—N(H)—(CH$_2$)$_3$—CH$_3$,
10 ml of cyclohexanone, 1 gr of Aliquat, 8.7 gr CaO. The reaction was carried out under argon atmosphere.

(II) Reaction on PVC Film or Chlorinated Polyethylene

A commercial PVC or chlorinated low density polyethylene was used. The latter film was made by dissolving chlorine gas in CCl$_4$, immersion of the film in it and illuminating the reaction mixture with tungsten lamp.

The film mentioned above were swirled in water containing the calcium salt of the N-butyl-3-thiopropionamide and a phase transfer catalyst. The results are summarized in Table 2.

TABLE 2

Grafting of N—butyl 3-thiopropion amide group on films of PVC and chlorinated polyethylene immersed in water.

| Film (50 μm) | Time of reaction (hr) | Temperature °C. | % Sulfur | % Chlorine |
|---|---|---|---|---|
| Chlorinated low density polyethylene | 0 | R.T. (28° C.) | 0 | 43.1 |
|  |  |  |  | 44.9 |
| Chlorinated low density polyethylene | 1 | 56° C. | 1.6 | 42.6 |
|  |  |  | 1.1 | 44.2 |
| Chlorinated low density polyethylene | 7 | 56° C. | 2.6 | 32.5 |
|  |  |  | 2.5 | 34.5 |
| PVC | 1 | 56° C. | 4.0 | 43.5 |
|  |  |  |  | 41.1 |
| " | 7 | 56° C. | 11.2 | 13.1 |
| " | 50 | R.T. | 6.0 | 34.4 |

(III) Reactivity of the amide substituted PVC toward epoxy resins

Amide substituted PVC and diglycidyl ether of bisphenol A

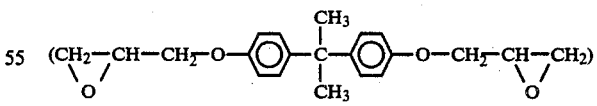

can be dissolved in a common solvent such as THF. A 3% solution of the grafted PVC and EPON 828 epoxy resin was cast to form a clear flexible film. The film was cured at 100° C. for 55 hours. FTIR analysis of the cured film was carried out. A decrease in the absorption of the oxirane functional group at 913 cm$^{-1}$ has been observed. A comparison between the FTIR spectrum of the film before aging and after it can be seen in FIG. 1. The absorption at 1182 cm$^{-1}$ which corresponds to the vibration of the C—C bond in the structure

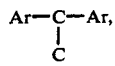

was taken as a reference. The ratio between the absorption at 1182 cm$^{-1}$ and 913 cm$^{-1}$ increases from 2.86 at room temperature to 7.06 after 55 hours at 100° C., indicating the disappearance of the oxiran structure. On the other hand the absorbance around 3380 cm$^{-1}$ becomes broader and larger indicating a formation of OH group which might be due to the opening of the oxirane ring. Table 3 represent the extraction experiments carried out on a mixture of amide substituted

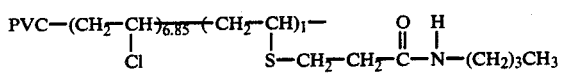

and Epon 828. The mixtures were cured at 100° C. for 48 hours.

TABLE 3

Extraction experiments of cured epoxy-PVC amide film (curing conditions 48 hrs at 100° C.).

| Composition of film | *Extracted by THF [moles × 10³] | | Moles ratio APVC:Epon 828 remain in cured film | **Extracted by toluene [moles × 10³] Epon 828 |
|---|---|---|---|---|
| Amide substituted PVC | | | | |
| (APVC) | 4.8 | APVC 0.34 | 1.65 | |
| Epon 828 | 8.5 | Epon 828 5.80 | | 6.3 |
| APVC | 4.8 | APVC 0.63 | 1.73 | |
| Epon 828 | 12.8 | Epon 828 10.4 | | 10.2 |

*Sohxlet extracted by boiling THF, 16 hrs.
**The film was swirled in toluene for 7 days at room temperature. The toluene was changed once a day.

The extraction experiments indicate that the molar ratio between the amide and the epoxy is about 1.65:1, respectively. That means that approximately one amide group reacts with one epoxy group. The mode of reaction is a follows:

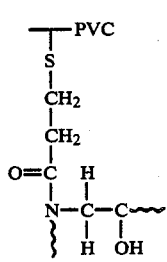

We claim:
1. An epoxy modified chlorine-containing polymer comprising a chlorine-containing polymeric backbone in which a part of the chlorine atoms have been substituted by a modification group of the general formula:

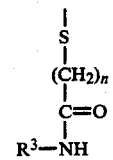

wherein R$^3$ is hydrogen, an alkyl group, benzoyl or a polyamide group, R$^1$, R$^2$, R$^4$ and R$^5$ are each hydrogen, an alkyl group or the residue of an epoxy resin, and n is in an integer from 1 to 100.

2. A polymer in accordance with claim 1, wherein said chlorine-containing polymeric backbone is chlorinated polyethylene.

3. A polymer in accordance with claim 1, wherein said chlorine-containing polymeric backbone is chlorinated polyvinyl chlorine.

4. A polymer in accordance with claim 1, wherein said chlorine-containing polymeric backbone is polyvinylidene chlorine.

5. A polymer in accordance with claim 1, being a polyvinyl chlorine wherein part of the chlorine is substituted by the thioamide groups, which is reacted so as to provide an excess of from 0.01 percent to 99.9 percent of epoxy groups calculated on thioamide groups.

6. A process for producing an epoxy modified chlorine-containing polymer, comprising reacting a thioamide modified chlorine-containing polymer consisting of a chlorine-containing polymer in which part of the chlorine atoms have been substituted by groups of the formula:

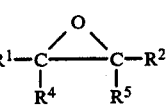

where n is an integer of 1 to 100 and R$^3$ is hydrogen, an alkyl group or a polyamide group, with an epoxy compound of the general formula:

$$R^1-C\underset{R^4}{\overset{O}{\diagup\diagdown}}C-R^2 \atop R^5$$

where R$^1$, R$^2$, R$^4$ and R$^5$ are each hydrogen, an alkyl group or the residue of an epoxy resin.

7. A process in accordance with claim 6, wherein said epoxy compound is selected from the group consisting of:

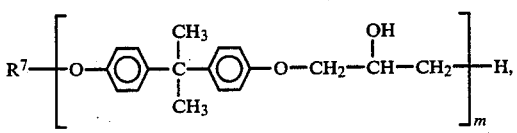

-continued

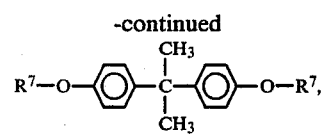

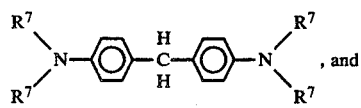

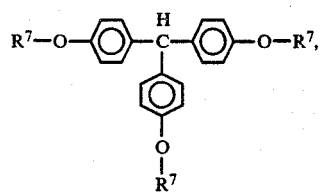

wherein $R^7$ is

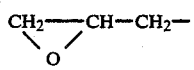

and m is zero or an integer of 1 to 20.

8. A process in accordance with claim 6 for the production of a film wherein a solution of said modified chlorine containing polymer and a solution of said epoxy compound are mixed together and the mixture is cast to form a film.

9. A process in accordance with claim 6, wherein said reacting step takes place in the presence of a catalyst to form a graft of the epoxy moieties on said modified chlorine-containing polymer.

10. A process in accordance with claim 9, wherein said catalyst is $BF_3$.

11. A process in accordance with claim 6, wherein said reacting step is effected at a temperature between 0° and 100° C.

12. A process in accordance with claim 6, wherein said thioamide modified chlorine-containing polymer is formed by reacting a film of chlorine-containing polymer with a compound of the formula:

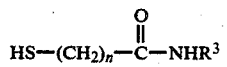

and said epoxy modified chlorine-containing polymer is formed by further reacting with said epoxy compound in solution or in bulk.

* * * * *